United States Patent [19]
Sonnen et al.

[11] Patent Number: 5,602,035
[45] Date of Patent: Feb. 11, 1997

[54] APPARATUS AND METHOD FOR TREATMENT OF ORGANICALLY CONTAMINATED SOIL

[76] Inventors: Klaus Sonnen, Waldstrasse 23, 56220 Bassenheim; Hans Sonnen, Schweitzerstrasse 36, 56203 Höhr-Grenzhausen, both of Germany

[21] Appl. No.: 330,440

[22] Filed: Oct. 28, 1994

[51] Int. Cl.⁶ ........................................ C12M 1/00
[52] U.S. Cl. ................ 435/262; 422/184.1; 435/289.1; 435/297.1; 435/290.2
[58] Field of Search ........................... 435/262, 299; 422/184

[56] References Cited

U.S. PATENT DOCUMENTS

| | | | |
|---|---|---|---|
| 4,457,441 | 7/1984 | McCloughan | 220/5 |
| 4,962,034 | 10/1990 | Khan | 435/262 |

FOREIGN PATENT DOCUMENTS

| | | |
|---|---|---|
| 0023176 | 1/1981 | European Pat. Off. . |
| 0192285 | 8/1986 | European Pat. Off. . |
| 0275096 | 7/1988 | European Pat. Off. . |
| 0450459 | 10/1991 | European Pat. Off. . |
| 3720833 | 8/1988 | Germany . |

OTHER PUBLICATIONS

Sonnen et al. "Acts for Biological Treatment" WPIDS (Derwent) Abstract for DE 4229926, Mar. 1994.

*Primary Examiner*—George Yeung
*Attorney, Agent, or Firm*—Michael N. Meller

[57] ABSTRACT

An apparatus and method is described for treatment of organically contaminated soil in which a modular structure having a plurality of interconnected segments with two end segments and at least one intermediate segment, allows for the formation of a system closed off from the outside atmosphere such that a vacuum can be maintained in the system and one or more gases can be supplied to the system, and in which at least one conduit interconnecting the gas supply with the vacuum such that a circuit is established for circulating the gas in the closed system.

13 Claims, 1 Drawing Sheet

5,602,035

APPARATUS AND METHOD FOR TREATMENT OF ORGANICALLY CONTAMINATED SOIL

FIELD OF THE INVENTION

The instant invention relates to an apparatus for and a method of biologically treating organic substances.

BACKGROUND OF THE INVENTION

The ever increasing amount of rubbish produced by our society leads to ever more severe burdening of the environment. An important factor in overcoming the problems involved is the recycling of waste. One known means of recycling such substances into the natural circuit is the biological utilization of organic matter occurring as waste (such as plant and animal residues) or present as contaminants in matter (such as xenobiotics as harmful substances in earth).

Any such treatment should offer a quick, safe, low-power way of making renewed use of the matter treated, above all without any hazards to the environment. In present day biological waste treatment, however, these aims are reached only insufficiently. That is true particularly of the biological treatment of contaminated soil and the like, where neither the process conditions in existing plants are the best nor is the exclusion of ecological risks guaranteed. In the decontamination of soil, a basic distinction is made between handling methods of the material in its natural ground compound (in-situ) or after excavation of the earth (ex-situ). The ex-situ methods can be applied either on site or off site. The material is placed on a base which is sealed in downward direction to prevent any further contamination. And it is put in an enclosure (tent, building) for protection against the emission of gases exiting from such soils. The exhaust air in part is filtered before it gets back into the atmosphere.

SUMMARY OF THE INVENTION

It is the aim of the invention to provide an apparatus and a method by which all of the problems mentioned can be resolved. More specifically, it is an object of the invention to provide a containment system for the biological treatment of substances by means of microorganisms which system is suitable both for on-site and off-site use.

The invention provides an apparatus comprising at least two end segments adapted to be interconnected so as to present a sealed unit formed with at least one opening which can be closed upon charging of the system with the matter to be treated so that the biological process can take effect inside a closed, sealed system.

The instant invention offers a distinct reduction in energy because the gas volume to be transported and/or handled can be reduced drastically as compared to conventional systems, and there is no need for circulating the whole amount of air in a tent or building.

Advantageous further developments and modifications of the invention may be gathered from the remainder of the claims.

The invention provides a kind of installation constructed for joining according to the mechanical assembly technique in that intermediate segments which are open at both ends can be coupled to two end segments for optimum adaptation of the volume to the quantity of material to be treated.

The individual segments of the system are designed such that they can be transported by the usual carrier vehicles (e.g. on flat bed trailers).

In view of the fact that the system presents a sealed unit, all the gases which escape from the material or are released during the biological process can either be conducted actively in a circuit or subjected to purification by suitable filters before they are released into the surrounding atmosphere. In this context monitoring of the gas composition may be applied for process control.

According to a modification, the space above the contaminated material within the system is evacuated which not only promotes air circulation through the material, involving an improvement of the supply of oxygen to the microorganisms, but also serves as a safety measure of the integrity of the system in that any undesired gas escape into the surrounding air is prevented even if there should be a leak in the system because in such an event air will be sucked into the system.

In accordance with another embodiment of the invention the material is worked upon while being treated in the closed system, and the moisture content and other parameters which are important for the treatment are adjusted to optimum values. Such treatment parameters as such are known in the art.

In further development of the invention, the processing of the material to be treated as well as the monitoring and setting of optimum operating conditions are automated to the widest extent possible in the art. The instant invention is particularly well suited for fully developed automatic process operations which means that the material is treated in a way which excludes any contact between persons and the material being treated or the resulting gases.

Optimum adjustment of the degree of humidity and other process parameters which are decisive for the treatment and monitored constantly in a closed system, either can be effected at the same time that the material is being processed in the apparatus or independently thereof.

BRIEF DESCRIPTION OF THE DRAWING

The invention will be described further by way of example with reference to the accompanying diagrammatic drawings, in which.

DESCRIPTION OF THE PREFERRED EMBODIMENTS

Figure 1:
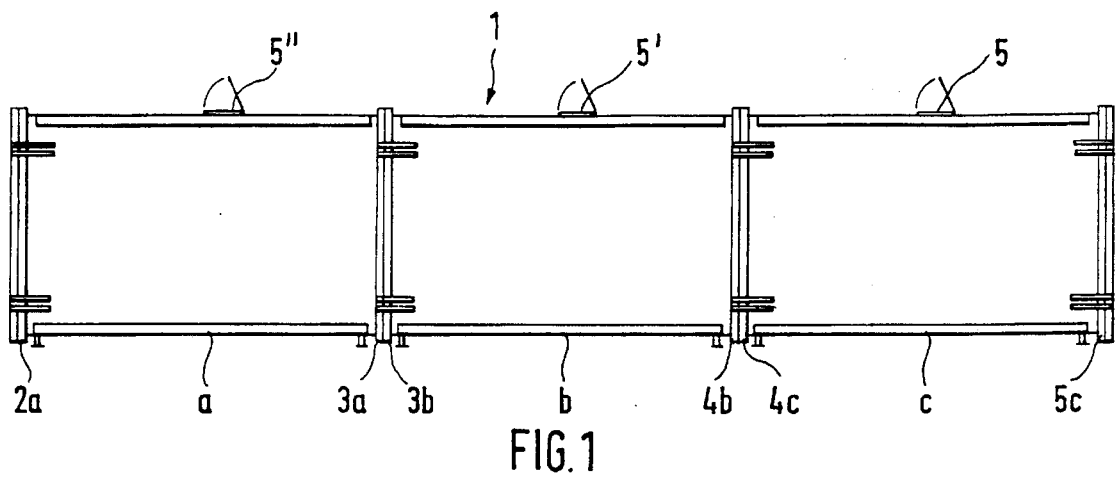
FIG. 1 is a side elevation of an apparatus consisting of two end segments and one intermediate segment.
Figure 2:
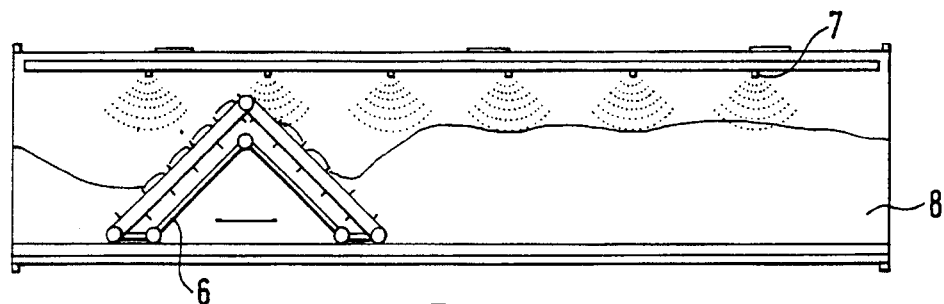
FIG. 2 is an axial longitudinal section of the apparatus shown in FIG. 1.

As shown by way of example in FIGS. 1 to 4, the apparatus 1 is made up of two end segments a, c and one or more intermediate segments b which are open towards both ends, the segments being interconnected by sealed flanges 3a, 3b, 4b, 4c. Flanges 2a and 5c are provided for closing the container. Each segment includes at least one opening which can be tightly closed. The individual segments are designed such that they can be carried by conventional transportation vehicles. To that end, the segments are provided with means which permit easy loading and unloading of carrier vehicles. In the embodiment shown, the base dimensions of the segments are greater than their height so that the segments can be shipped lying on the side. Each end segment may be provided with one or more door elements. The end segments are adapted to house the aggregates/machines required for automatic process operations.

One or more vacuum pumps 10 are connected to the individual segments at position 11 above the material 8 to be treated so as to generate vacuum in the system. A respective connecting line 12 at the bottom of each segment can be hooked up to the vacuum pump(s). Furthermore, a means 6 is provided for working the material, as well as a sprinkler means 7.

Figure 5:
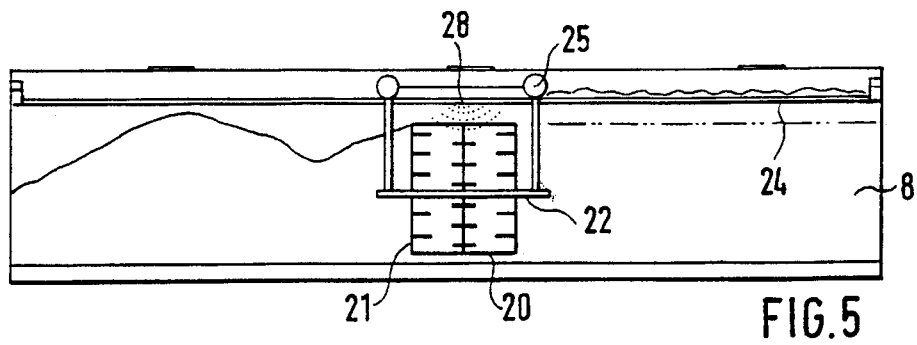
FIG. 5 is an axial longitudinal section of a second embodiment of the invention.

The second embodiment of the invention illustrated in FIG. 5 shows an alternative method of treating material in the closed system. Here, a knife-like device 20, 21 mounted on a rotating axis 22 is moved within the system on rollers 25 along rails 24 from one end segment to the other while it works on the material. The power required for this movement is supplied electrically or hydraulically to the system. Also this embodiment may be equipped with a sprinkler means 28 to act on the material while it is being treated.

Figure 3:
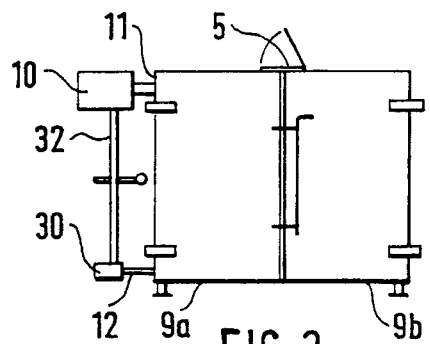
FIG. 3 is a front end elevation of the apparatus shown in FIG. 1.
Figure 4:
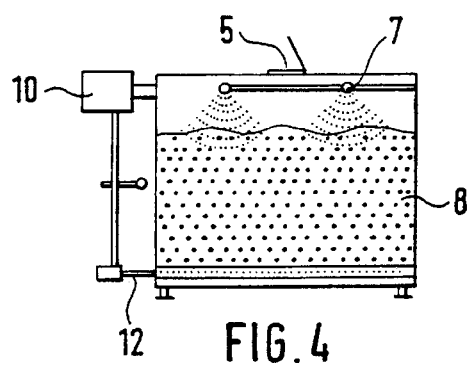
FIG. 4 is a cross section of the apparatus shown in FIG. 1.

Once the system has been loaded, it is closed and vacuum is applied to the surface of the material to be treated by means of the vacuum pump(s) 10. Oxygen may be supplied through connections 30 and the connecting lines 12. Reference numeral 32 is a connecting line between vacuum pump 10 and connection 30. The supply of oxygen may be effected under pressure. The vacuum pump(s) 10 and connection(s) 30 are connected by means of at least one conduit (32) which establishes a circuit including a closed system. The material may be treated inside the machine from one end to the other at certain intervals, depending on the progress of treatment and on process operating conditions. Measures of maintaining optimum process conditions either can be taken simultaneously with the ongoing treatment or independently of the same. Reference numerals 9a and 9b of FIG. 3 are bottom plates of the container.

This way of realizing process operations permits the installation to be operated fully automatically. By virtue of the vacuum created, gases cannot exit from the system into the atmosphere even if leaks should occur. Resulting gases from the treatment either are circulated within the system or cleaned by filters before being released from the system.

Gases are supplied separately to each segment and can be metered and controlled individually. The gas supplied either may be oxygen or another gas (perhaps a gas mixture) which will promote the continuation of the biological process. The gas may be preheated prior to its introduction into the system. Furthermore, heating the material to be treated provided for during the biological process will accelerate the process. Any available sources of waste heat, either external or, for example, the various instruments of the system, may be utilized to heat of the material.

For sampling during treatment, the apparatus is provided with apertures 5 which can be closed. They may include membranes which help in the drawing of samples. Since vacuum prevails in the system, no toxic gases can leave the system when samples are taken.

During normal operation, seeping water should not appear. If, however, excess liquid does show up, it may be sucked out of the system through the connecting lines 12 and be dealt with accordingly. In general, the material 8 to be treated is subjected to pretreatment, as may be required, prior to loading. What is aimed at in this context, for instance, is size fractioning (perhaps breaking up the material), improvement of the structure by homogenization, and, if desired, the addition of structural agents. Moreover, various parameters, such as moisture, pH, and nutrients are adjusted by means of adjuvants, and suitable microorganisms are added, if required. Also, the biological activity of natural populations of microorganisms could be exploited in the biological treatment of certain substances by mixing substances with an organic matrix (such as earth or compost) and treating the mixture in the apparatus. It is only by the closed, variable volume system of the invention that such a strategy becomes feasible.

In modifying the method desribed above, the apparatus illustrated in FIGS. 1 through 5 also may be used to introduce harmful substances into matter, especially to introduce harmful substances into soil and the like. The underlying aspect of the invention in this instance is the problem of having to "remove" certain harmful substances, especially chemicals in a non-harmful way. The pharmaceutical industry, for example, is faced with the problem of having to withdraw from circulation certain chemicals in a manner which does no harm. Microorganisms are contained "naturally" in soil, and they can be put to use without any additional measures to metabolize certain chemicals. In this case, the chemicals are made to enter the soil and metabolize by means of an apparatus as specified above with reference to FIGS. 1 to 5. Where the given microorganisms already present in the soil are not "specialized" to the chemicals to be metabolized, populations of microorganisms which are suitable to cause the decay of any particular chemicals by metabolization may be added to the soil.

What is claimed is:

1. An apparatus for biological or chemical treatment or both of a material containing harmful substances, said apparatus comprising a container being assembled by a plurality of segments which are connected to each other to form the container, said container comprising two end segments and one or more intermediate segments which are positioned between the end segments, the number of intermediate sections being adaptable to the quantity of material to be treated, the interior of said container being closed off from the outside atmosphere in a gas-tight manner, said apparatus further including a conduit, which is in fluid connection with the interior of said container at a vertically upper section and at a vertically lower section of the container, said conduit establishing a closed gas flow circuit including the interior of the container.

2. An apparatus according to claim 1, wherein a means for supplying a gas stream is provided in said closed gas flow circuit in which said gas stream enters the interior of said container at said vertically lower section and exits through the conduit from said interior at said vertically upper section.

3. An apparatus according to claim 1, wherein a vacuum means is provided for generating in said interior a pressure lower than the pressure of the outside atmosphere.

4. An apparatus according to claim 1, wherein a means is provided for introducing oxygen or other gases into said interior of the container.

5. An apparatus according to claim 1, wherein means are provided to work mechanically on the material during treatment in the interior of the container.

6. An apparatus according to claim 2, wherein means are provided to remove from said gas stream in said circuit substances resulting from the treatment of the material.

7. An apparatus according to claim 1, wherein means are provided for introducing liquids into the interior of the container.

8. A method of treating organic material containing harmful substances, said method comprising the steps of:

provinding an apparatus which comprises a container being assembled by a plurality of segments which are connected to each other to form the container, said container comprising two end segments and one or more intermediate segments which are positioned between the end segments, the number of intermediate sections being adaptable to the quantity of material to be treated, the interior of said container being closed off from the outside atmosphere in a gas-tight manner, said apparatus further including a conduit, which is in fluid connection with the interior of said container at a vertically upper section and at a vertically lower section of the container, said conduit establishing a closed gas flow circuit including the interior of the container;

loading said material to be treated in the container of said apparatus;

closing the container; and circulating a gas through said conduit and said interior of the container to treat said organic material containing harmful substances.

9. A method according to claim 8, wherein said circulating gas is introduced into said interior of the container below the material to be treated such that lower pressure prevails above the material than below the material.

10. A method according to claim 8, comprising the step of working said material mechanically during the treatment.

11. A method according to claim 8, comprising the step of introducing periodically at intervals a pressurized gas at the bottom side of the material.

12. A method according to claim 8, wherein said material is soil containing harmful substances.

13. A method of disposing of harmful substances in soil, said method comprising the steps of:

providing an apparatus which comprises a container being assembled by a plurality of segments which are connected to each other to form the container, said container comprising two end segments and one or more intermediate segments which are positioned between the end segments, the number of intermediate sections being adaptable to the quantity of material to be treated, the interior of said container being closed off from the outside atmosphere in a gas-tight manner, said apparatus further including a conduit, which is in fluid connection with the interior of said container at a vertically upper section and at a vertically lower section of the container, said conduit establishing a closed gas flow circuit including the interior of the container;

loading the soil to be treated in the container of said apparatus, said soil containing microorganisms which metabolize said harmful substances;

closing the container; and circulating a gas through said conduit and said interior of the container to treat said soil containing harmful substances.

* * * * *